(12) United States Patent
Mannava et al.

(10) Patent No.: US 8,949,547 B2
(45) Date of Patent: Feb. 3, 2015

(54) COHERENCY CONTROLLER AND METHOD FOR DATA HAZARD HANDLING FOR COPENDING DATA ACCESS REQUESTS

(75) Inventors: Phanindra Kumar Mannava, Austin, TX (US); Jamshed Jalal, Austin, TX (US); Ramamoorthy Guru Prasadh, Austin, TX (US); Michael Alan Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 592 days.

(21) Appl. No.: 13/137,356

(22) Filed: Aug. 8, 2011

(65) Prior Publication Data

US 2013/0042077 A1    Feb. 14, 2013

(51) Int. Cl.
*G06F 12/08*     (2006.01)
*G06F 13/14*     (2006.01)
*G06F 9/38*      (2006.01)

(52) U.S. Cl.
CPC .............. *G06F 12/0831* (2013.01); *G06F 9/38* (2013.01); *G06F 2212/621* (2013.01)
USPC .......................................... 711/146; 711/141

(58) Field of Classification Search
CPC .. G06F 12/0831; G06F 2212/621; G06F 9/38
See application file for complete search history.

(56) References Cited

U.S. PATENT DOCUMENTS

| | | | |
|---|---|---|---|
| 6,279,087 B1 * | 8/2001 | Melo et al. | 711/146 |
| 6,286,082 B1 * | 9/2001 | Moudgal et al. | 711/143 |
| 7,600,080 B1 * | 10/2009 | Bhattacharyya et al. | 711/143 |
| 2003/0070048 A1 | 4/2003 | Spangler et al. | 711/146 |
| 2010/0306470 A1 | 12/2010 | Speier et al. | 711/122 |
| 2012/0198162 A1 * | 8/2012 | Chachad et al. | 711/122 |

OTHER PUBLICATIONS

UK Search Report dated Oct. 8, 2012 in GB 1210481.6.
UK Search Report dated Apr. 4, 2013 in GB 1210481.6.

* cited by examiner

*Primary Examiner* — Sanjiv Shah
*Assistant Examiner* — Glenn Gossage
(74) *Attorney, Agent, or Firm* — Nixon & Vanderhye P.C.

(57) ABSTRACT

A data processing system that manages data hazards at a coherency controller and not at an initiator device is disclosed. Write requests are processed in a two part form, such that a first part is transmitted and when the coherency controller has space to accept data, the data and a state of the data prior to a write are sent as a second part of a write request. When there are copending reads and writes to the same address, writes are stalled by not responding to the first part of a write request and snoop requests received to the address are processed regardless of the fact that the write is pending. When the pending read has completed, the coherency controller will respond to the first part of the write request and the initiator device will complete the write by sending the data and a state indicator following the snoop.

8 Claims, 8 Drawing Sheets

COHERENCY CONTROLLER AND METHOD FOR DATA HAZARD HANDLING FOR COPENDING DATA ACCESS REQUESTS

BACKGROUND OF THE INVENTION

1. Field of the Invention

The field of the invention relates to the field of data processing and in particular, to the field of maintaining data coherency.

2. Description of the Prior Art

In data processing systems, data is often stored locally to a processor in order to improve data access speeds. However, this can result in several copies of data being held and care must be taken to ensure data coherency between the different copies of the data. Thus, when storing data locally, a state indicator is often stored along with the data indicating whether that copy of the data is a valid or invalid copy, whether it is clean—that is, the same version as that stored in memory, or dirty—that is it is a more up to date version than the version stored in memory. There may in some systems be further indicators such as a data unique indicator that indicates that that copy is the only local copy, or a shared indicator indicating that there is more than one local copy.

Data coherency is maintained with snoop requests, which, in response to a read request, snoop local data stores to see where the most up to date version of the data is stored. This data may then be retrieved and the state indicator associated with the data may be updated. If a copy of data stored in a local store is dirty, then prior to it being evicted from the local store it must be written back to memory.

Data hazards can occur when a write request to one address is requested when a read request to that address and the snoops that it has generated are still pending. In order to address this problem in conventional systems, snoop responses to addresses that have a write pending are blocked until the write completes, whereupon they can proceed. This has a drawback of requiring sufficient buffer space to guarantee forward progress of the write, as if the write cannot proceed there may be a mutual resource dependency which may result in a deadlock situation. As systems scale up with many more recipients and initiators, this problem of providing sufficient buffer space to guarantee forward progress of writes will also become larger. This has a power and area implication.

It would be desirable to avoid data hazards without unduly increasing power consumption and die area.

SUMMARY OF THE INVENTION

A first aspect of the present invention provides an initiator device comprising: circuitry for generating data access requests; a data store for storing data and for storing a state indicator associated with said data, said state indicator indicating at least one of whether said data is invalid, is valid and a same value is stored elsewhere, is valid and is a more up to date version of a version of said data stored elsewhere; at least one port for outputting said data access requests for transmission to at least one recipient device via a coherency controller and for receiving signals and data access requests from said coherency controller; wherein said circuitry is configured to generate write requests for writing data stored in said data store to one of said at least one recipient device and read requests for reading data stored in one of said at least one recipient device; said circuitry being configured to generate said write requests in two parts, a first part comprising an indication that a write is to be performed and an address of data to be written, and a second part; wherein said initiator device further comprises control circuitry, said control circuitry being configured to: respond to receipt of a snoop request at said at least one port to accept said snoop request and control said snoop request to be executed regardless of whether or not said snoop request is requesting access to a location of a pending write request for which said first part has been output and for which no data acceptance guarantee has been received; and respond to receipt of said data acceptance guarantee at said at least one port and to a current state of said data to be written being valid and a more up to date version of a version of said data stored elsewhere, to output, as said second part of said write request, said data and the current state of said data, prior to said data being written.

The present invention recognises that it may be advantageous in some systems to send a write request in two parts. Where a write request is sent to a remote recipient for example, it may be that the recipient does not have capacity to accept the write. If this is the case the write will need to be sent again and again may not be accepted. If data is sent along with the write request as is usual with write requests, then the amount of bandwidth used to continually send and resend this write request is large. In some systems a write request can be sent in two parts to address this problem. A first part provides an indication that the request is a write and an indication of an address to be written to. This first part of the write request will be accepted and a response sent when it is determined that the complete write request can be accepted and in response to this response the second part of the write request including the data is sent. This may add delay to the write request, but write requests are not performance critical such that this may be acceptable.

Thus, the present invention utilises this sort of two part write request with a first part indicating that data is to be written to a particular address and a second part sending the data when a response to the first part has been received guaranteeing that the data will be accepted. This prevents requests with data attached to them being sent multiple times if the recipient cannot accept them.

The present invention also recognises that in systems that implement data write requests in this two part way, it is relatively simple to stall a pending data write by not responding to the first part. Thus rather than stalling a snoop response when there is a pending write, the initiator device of the present invention treats snoop requests in the same way regardless of whether a write to the same address is pending. This means that the pending snoop is not blocked while the write completes as occurs in the prior art, and reserved buffer space required to guarantee forward progress of the write is not required.

The potential data hazard that arises when snoop and write requests to a same address are concurrently pending can be dealt with by a coherency controller that the responses to the snoop requests and the write data are sent to, provided that, at least in cases where the data following the snoop is dirty data, information regarding the state of the data and the data itself are also transmitted to the coherency controller.

By transmitting state information along with the data to the coherency controller, in addition to responding to snoops as though a data hazard did not exist, coherency control can be managed by the coherency controller and the initiator device does not need any hazard checking circuitry which provides a significant saving in area, particularly in large systems having many initiator devices.

A further advantage of this system is that the data flow that is created is uniform and despite the potential hazards, each of the read, snoops and writes generally complete. This makes modelling and validation simple.

Furthermore, the additional latency due to stalling one of the co-pending requests is added to the write rather than the read, which is advantageous as writes are not performance critical.

In some embodiments, said control circuitry is configured in response to a snoop request being executed to update said state indicator associated with data where appropriate and to output as a response to said snoop request an indication of said state indicator before and after said update along with said data.

A snoop request is handled in the same way whether or not there is a potential data hazard. Thus, data is returned in response to a snoop along with the state of the data before the snoop and the state of the data after the snoop.

In some embodiments said control circuitry is configured to respond to receipt of said data acceptance guarantee at said at least one port to generate and output as said second part of a write request data and a state of said data prior to said second part of said write request being performed irrespective of said state of said data prior to said write request.

Although the state indicator for data may indicate in some cases that a write does not need to be performed and thus, the data does not need to be transmitted to the coherency controller, it may be advantageous to transmit the data and state of the data in all cases. Although this may result in more information being transmitted than is necessary it does mean that the behaviour of the initiator device is uniform irrespective of the data state and this makes the logic circuitry and the validation of this circuitry simpler and also generates a uniform data flow.

In some embodiments, said control circuitry is configured to respond to receipt of a data acceptance guarantee at said at least one port, and to said state of data prior to a second part of a write request being performed being invalid, to output a write cancelled request as said second part of said data write request.

There are some states of data following a snoop where a write can in fact be cancelled and the data does not need to be sent, and in these cases it may be advantageous to transmit a write cancelled request as a second part of the write request. This requires less bandwidth than transmitting the data and the state of the data. In a two-part write request, the first part of the write request indicates that the request is coming and a response is sent when the first part of the write request has been accepted as there is then a guarantee that the data can be accepted. This may mean that a storage location is reserved for this request. If this is the case it is clearly important if the write request is not to proceed that an indication that the write request has been cancelled is sent, so that any storage location reserved for this request and the data associated with the request can be freed. In the case that the state of the data has become invalid during the snoop the data clearly does not need to be written further and thus, this is a case where the write should be cancelled.

In some embodiments, said control circuitry is configured to respond to receipt of a data acceptance guarantee at said at least one port, and to a state of data prior to a write being performed being valid and a same value is stored elsewhere, to output a write cancelled request as said second part of said write request.

In addition to the case where data is invalid, where the data is valid but is clean, such that there is the same version of the data stored elsewhere, then a write also does not need to complete, although in this case it can complete. Thus, in some embodiments, the initiator device may choose to proceed with the write and transmit the data and the indication of state, while in other embodiments it might save bandwidth and transmit the write cancelled request.

In some embodiments, a size of a first part of a write transaction request is the same as a size of a read transaction request.

A further advantage of dividing a write request into two parts is that these parts are smaller and the first part can be made to be the same size as a read request which makes logic for processing these requests simpler.

A second aspect of the present invention provides a coherency controller for maintaining data coherency of data stored in a data processing apparatus comprising at least one initiator device and at least one recipient device, said coherency controller comprising: at least one port for receiving data access requests from said at least one initiator device and for transmitting said data access requests and snoop requests to at least one of said at least one initiator device and said at least one recipient device; a buffer for storing pending data access requests; snoop request generating circuitry for generating said snoop requests in response to data access requests, said snoop requests for determining whether data to be accessed is stored locally in one or more of said at least one initiator device and said at least one recipient device; and coherency control circuitry responsive to receipt of a first part of a write request comprising an indication that a write is to be performed to an address for which a read request is pending, to stall said write request by not responding to said first part of said write request until after said pending read request has completed.

The present invention recognises that in systems that implement data write requests in this two part way, it is relatively simple to stall a pending data write by not responding to the first part. Furthermore, it recognises that if in response to a potential data hazard between a pending read/snoop request and a pending write request to a same address, one stalls the pending write request rather than the snoop request, then the latency of a read will not be affected, and the buffering requirements associated with guaranteeing space to store a write, thereby allowing it to progress, will not arise.

Thus, a coherency controller according to an aspect of the present invention stalls a pending write request in response to detecting a pending read request to the same address and allows the pending read request to complete before allowing the pending write request to continue. Provided that in at least some cases the change of states of data to be written that occur in response to snoop requests are communicated along with any returned data to the coherency controller, the coherency controller can maintain coherency and on completion of a read, can respond to the first part of a write request thereby signalling that the write can proceed.

This has the advantage of increasing the latency of the write rather than the read, avoiding the buffering requirements associated with ensuring that a write is guaranteed to make forward progress that are required if snoops are stalled and has the additional advantage that since reads and writes are treated in the same way, they can be treated with the same logic block.

In some embodiments, said coherency control circuitry is responsive to receipt of a signal indicating completion of a read request to respond to said first part of a write request.

Once the read request has completed the coherency controller will allow a write to proceed further by responding to the first part of the write request.

In some embodiments, said coherency control circuitry is responsive to receipt of a second part of said write request comprising data and an indication of a state of a data prior to a write request, to write said data to said recipient device if state indicates said data is valid and is a more up to date version than a version of said data stored elsewhere.

When the coherency control circuit receives data and state of the data, it can then determine depending on the state what to do with the data. Thus, if the data is valid and more up to date than a version of the data stored elsewhere it will proceed to write the data to a recipient device. If however the data is invalid then it will not write the data further, while if the data is valid but is clean—that is the same as a value stored elsewhere, then it can chose either not to write the data further or to proceed and write the data further. The latter case will require more bandwidth but is a uniform way of proceeding and may have advantages when testing and validating the system.

In some cases rather than sending the data and an indication of the state of the data as a second part of a write request, a write cancelled request may be sent which indicates that the state of the data is such that it does not need to be written back and the write request is to be cancelled. It is important that this is sent as prior to responding to a first part of a write request a storage location in the coherency controller may have been reserved for the data. The write cancelled request indicates to the coherency controller that this storage location is no longer required and it can be freed up for use by other requests.

In some embodiments, all storage locations within at least one buffer are available for storing both read requests and write requests at start up, said coherency control circuitry being configured to reserve a storage location for a second part of a write request when accepting a first part of said write request and to respond to a first part of said write request with a data acceptance guarantee response indicating that a storage location is reserved.

In systems of the prior art where snoop requests are blocked in response to potential data hazards it is important that write transactions are guaranteed forward progress so that a write that needs to complete before a snoop request can continue is not blocked causing a deadlock condition. In order to ensure this, buffers in coherency controllers had storage locations within their buffers that were reserved exclusively for pending write transactions. This had the disadvantage of increasing the required storage capacity within these devices, which has significant impact on larger systems with many such devices. As the present invention blocks a write request and not a snoop response, there is no need to guarantee forward progress of the write in this way and thus, there is no need for certain storage locations within a buffer to be reserved exclusively for writes. Thus, in embodiments of the present invention buffers are available for storing both read and write requests at start up and it is only during operations when a response is given to a first part of a write request that a storage location within a buffer may be reserved temporarily for a write request. Thus, more efficient use is made of the buffers as each storage location can be used for either read, write or snoop requests and the buffers can be made smaller.

A third aspect of the present invention provides a data processing system comprising at least one initiator device according to a first aspect of the present invention, a coherency controller according to a second aspect of the present invention and at least one recipient device.

A fourth aspect of the present invention provides a method for generating data access requests and processing snoop requests within an initiator device; comprising storing data and storing a state indicator associated with said data, said state indicator indicating at least one of whether said data is valid, is stored elsewhere and is a more up to date version of said data than a version of said data stored elsewhere; receiving signals and data access requests from a coherency controller; generating write requests for writing data stored in a data store to at least one recipient device and read requests for reading data stored in said at least one recipient device; wherein said write requests are generated in two parts, a first part comprising an indication that a write is to be performed and an address of data to be written, and a second part transmitted in response to receipt of a data acceptance guarantee at at least one port; and in response to receipt of a snoop request accepting said snoop request and controlling said snoop request to be executed in a same way whether or not said snoop request is requesting access to a location of a pending write request for which said first part has been output and for which no data acceptance guarantee has been received; and in response to receipt of said data acceptance guarantee and to a state of said data to be written being valid and a more up to date version of a version of data stored elsewhere to output as said second part of a write request said data and a current state of said data prior to said data being written.

A fifth aspect of the present invention provides a method of maintaining coherency of data comprising: receiving data access requests from at least one initiator device; transmitting said data access requests and snoop requests to at least one of said at least one initiator device and said at least one recipient device; storing pending data access requests; generating snoop requests in response to said data access requests, said snoop requests for determining whether data to be accessed is stored locally in one or more of said at least one initiator device and said at least one recipient device; and in response to receipt of a first part of a write request comprising an indication that a write is to be performed to an address for which a read request is pending, stalling said write request by not responding to said first part of said write request until after said pending read request has completed.

A sixth aspect of the present invention provides an initiator means comprising: circuitry means for generating data access requests; a data storage means for storing data and for storing a state indicator associated with said data, said state indicator indicating at least one of whether said data is valid, is stored elsewhere and is a more up to date version of said data than a version of said data stored elsewhere; at least one port means for outputting said data access requests for transmission to at least one recipient device via a coherency controller and for receiving signals and data access requests from said coherency controller; wherein said circuitry means is for generating write requests for writing data stored in said data store to one of said at least one recipient device and read requests for reading data stored in one of said at least one recipient device; said circuitry means is for generating said write requests in two parts, a first part comprising an indication that a write is to be performed and an address of data to be written, and a second part transmitted in response to receipt of a data acceptance guarantee at said at least one port means; wherein said initiator means further comprises control means for responding to receipt of a snoop request at said at least one port means by accepting said snoop request and controlling said snoop request to be executed in a same way whether or not said snoop request is requesting access to a location of a pending write request for which said first part has been output and for which no data acceptance guarantee has been received, and for responding to receipt of said data acceptance guarantee at said at least one port means and to a state of said data to be written being valid and a more up to date version of a version of said data stored elsewhere to output as a second part of a write request said data and a current state of said data prior to said data being written.

A seventh aspect of the present invention provides a coherency controlling means for maintaining data coherency of data stored in a data processing apparatus comprising at least one initiator device and at least one recipient device, said coherency controlling means comprising: at least one port means for receiving data access requests from said at least one initiator device and for transmitting said data access requests and snoop requests to at least one of said at least one initiator device and said at least one recipient device; a buffer means for storing pending data access requests; snoop request generating means for generating said snoop requests in response to said pending data access requests, said snoop requests for determining whether data to be accessed is stored locally in one or more of said at least one initiator device and said at least one recipient device; and coherency control means for responding to receipt of a first part of a write request comprising an indication that a write is to be performed to an address for which a read request is pending, by stalling said write request by not responding to said first part of said write request until after said pending read request has completed.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
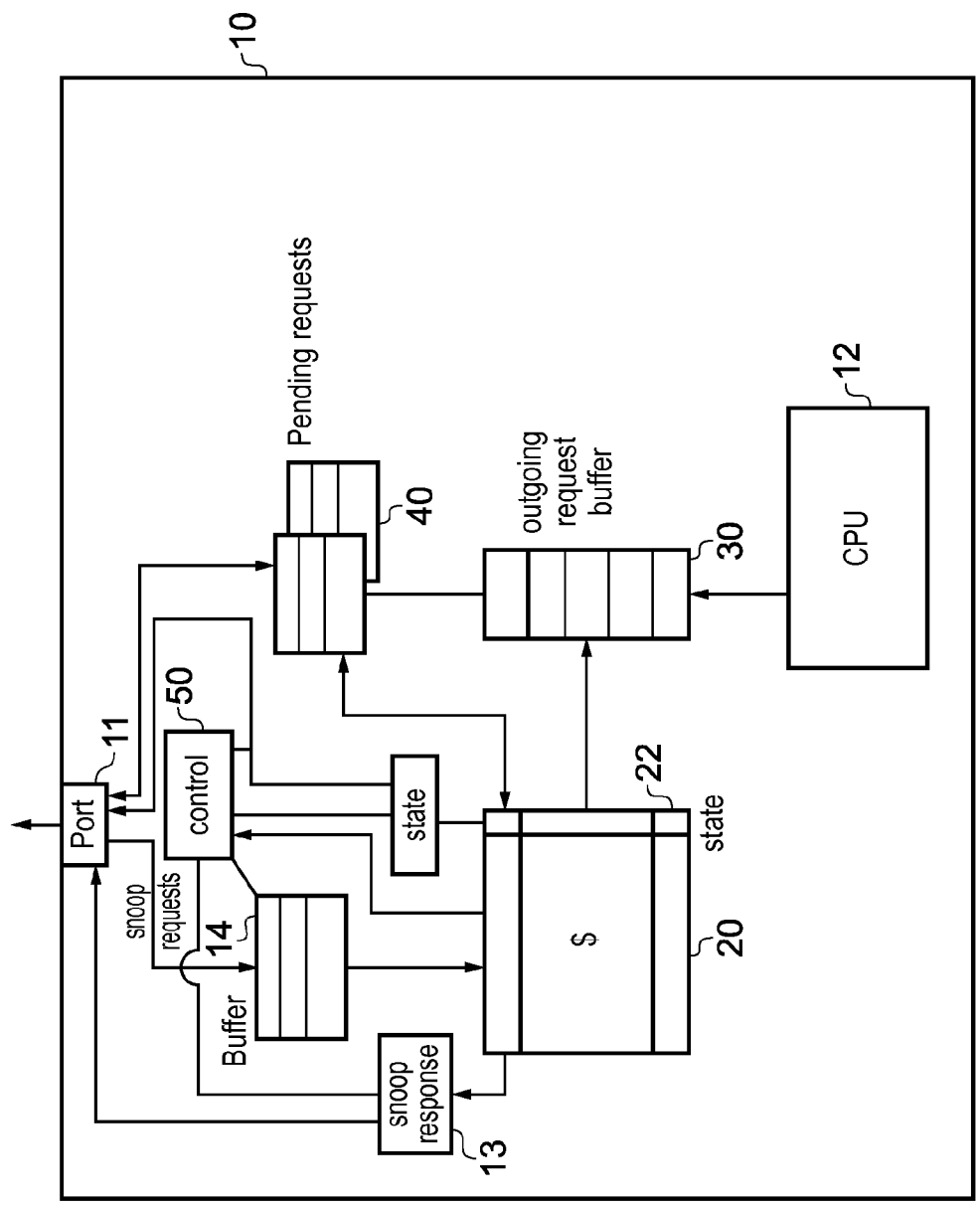
FIG. 1 shows an initiator device according to an embodiment of the present invention.

FIG. 1 shows an initiator device 10 according to an embodiment of the present invention. This initiator device 10 may be a data processing apparatus, a processor core, a direct memory access (DMA) controller, a graphics engine or in fact any device that generates data access requests. In the initiator device 10 shown, there is a central processing unit 12 that generates data access requests. There is also a cache 20 for storing local copies of data. The cache can itself generate write requests in response to coherency operations and invalidation operations performed in the cache.

Cache 20 stores local copies of data along with a state indicator 22 indicating the status of these particular local copies. The state may indicate that the data is valid or invalid. Data entries in caches are marked as invalid to indicate that the cache line is free to be used to store other data items. The state may also be "clean" indicating that the copy of the data stored there is the same as the copy stored in memory. The state may also indicate that the data is "dirty" that is, it is a more up to date copy than any copies of the data stored elsewhere and in particular than the copy of data stored in memory. There may be other states such as "shared" and "unique" which indicate whether or not there are other local copies of this data elsewhere.

When accessing data within the cache 20, coherency operations may be performed to ensure that coherency of the data being processed in this device and in other devices is maintained. These coherency operations may result in write requests being generated by the cache 20.

Thus, various write and read requests are generated by the CPU 12 and write requests may be generated by cache 20 and these are stored in an outgoing request buffer 30. When they are ready to be issued from the initiator device to an interconnect for transmission to the recipient of the transaction requests via a coherency controller they will enter pending request buffer 40. This buffer may have additional space for storing the data associated with these requests. They are stored in this buffer until a response has been received from the device to which they were sent, in this case a coherency controller.

Initiator device 10 also has control circuitry 50 which controls the issuing of requests and the receipt of data and incoming snoop requests that arrive at port 11 and are stored as pending requests in buffer 14. As initiator device 10 has local storage cache 20 the external coherency controller which is controlling the coherency of the data stored in the different devices of the system may generate and transmit snoop requests to initiator device 10 to determine whether cache 20 is storing a local copy of the data that it wishes to access. Thus, snoop requests are received at port 11 and snoop responses are output via buffer 13 in response to a control signal from control 50. These snoop responses will return the data of the snoop request if it is stored locally and will also return an indication of the state of the data before and after the snoop as the snoop request may change the state of the data. Sending the state in this way allows the coherency controller to perform any necessary operations required to maintain coherency.

In this initiator device there is no data hazard checking logic and thus, if a write request is pending and a snoop request is received to the same address as the pending write request, the snoop request will be processed in the same way as had there not been a pending snoop request. This is because the initiator device does not recognise that a data hazard may exist as it has no hazard checking logic.

In this embodiment, the write requests are generated in two parts and thus, a first part of a write request is issued and when a response to this is received the second part of the write request which consists of the data, an identifier identifying it as being the second part of the write request and the state of the data prior to the write is transmitted. The response to the first part of the write request indicates that the device receiving the write request has storage space for storing the data and thus, is ready to receive the second part of the write request. This avoids the data being sent speculatively in the hope that there will be space to receive it. The data takes up a lot of bandwidth and thus, only having to send it once is advantageous.

Once the first part of the write request has issued, a snoop request may be received for the same address. As there is no data hazard checking logic within initiator device 10, this potential data hazard is not recognised and the snoop request is processed in the usual way. Thus, the snoop request accesses the data that is to be written by the write request, determines its current state, returns the data and updates the state as appropriate.

The control circuitry 50 waits for receipt of a response to the first part of the write request before proceeding with this request and this is received after the snoop request has completed since the coherency controller that generates this response is managing the potential data hazard and will not generate the response until it has received the response to the snoop request and the read request to which it pertained is complete. Once a response to the first part of the write request has been received then the data along with an indication of the current state of the data, that is the state of the data following the snoop request is output. The state of the data may then be updated as required.

Now it should be recognised at this point that in some cases the state of the data that is being sent will have been amended by the snoop request and as such the write may no longer be required. Thus, in some embodiments control circuitry 50 receives an indication of the state of the data from the cache 20 and only responds with the second part of the write request if it determines that the state of the data following the snoop is such that a write is still required. If it determines that the data no longer needs to be written then it will not respond with the data, it may however respond with a write cancelled request. It will do this since the response to the first part of the write request indicated that there was a guaranteed place at the coherency controller for the data. This is generally been done by reserving a storage location for this data and thus, it is important if the write is not to proceed that the coherency controller is informed of this so that it can free up the reserved storage location.

Although, not sending the data when not required will reduce bandwidth requirements, it may be advantageous to transmit the data along with an indication of the state of the data whether or not it is still required for the write as this is uniform behaviour and the logic required to implement it and the logic required to validate the circuitry is simpler.

Figure 2:
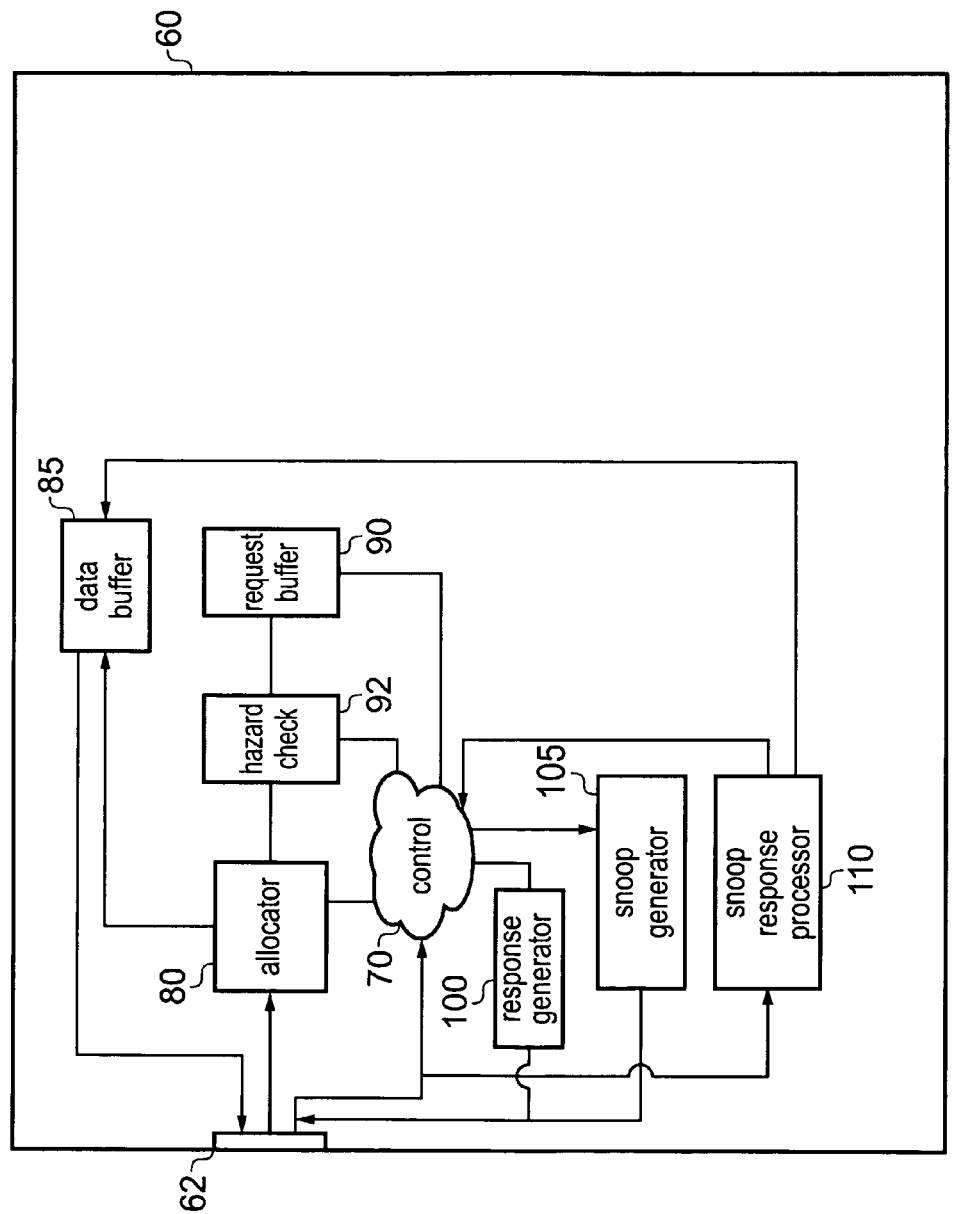
FIG. 2 shows a coherency controller according to an embodiment of the present invention.

FIG. 2 shows a coherency controller 60 according to an embodiment of the present invention. Coherency controller 60 receives requests from initiator device 10 at port 62. Coherency controller 60 controls the coherency of the different data copies stored locally in the various initiator devices and in the recipient device such as memory. The coherency controller 60 has control circuitry 70 for controlling the requests that are received and output. Control circuitry 70 controls an allocator 80 that receives the requests that arrive at port 62. These requests may be a first part of a write request or a read request or they may be the second part of the write request containing data to be stored. Allocator 80 allocates the data that arrives to a data buffer 85. Allocator 80 allocates read requests and the first part of write requests to request buffer 90 having first checked them through hazard checking logic 92. Hazard checking logic 92 determines whether there are any pending requests to the same address. If hazard checking logic 92 detects that there is a first part of a write request received to an address to which a read is pending then control circuitry 70 does not allow response generator 100 to respond to this first part of the write request. If a first part of a write request has been received and hazard checking logic 92 has determined that there is a pending read to this address then control circuitry 70 stops response generator 100 from generating a response to the first part of the write request until the pending read request and any other pending hazard requests have completed.

Coherency controller 60 also has snoop generator 105 that in response to receipt of a read request to a particular address will generate snoop requests to that address. These snoop requests are sent to initiator devices that have local storage to check whether there is a data item stored at this address in any of the local stores. Coherency controller 60 also has a snoop response processor 110 for receiving and processing responses to these snoop requests. The snoop responses may return the data as well as the state of the data before and after the snoop and the snoop response processor will store the returned data in data buffer 85. Once the snoops for a particular read have completed then the read can complete, perhaps by reading the memory address or perhaps by returning the data that the snoop has returned to the initiator device that generated the read. Control circuitry 70 may also write data returned by the snoop to memory where the state of the data indicates that this is required.

Once the response to the read request has been received at coherency controller 60 then control circuitry 70 will allow the stored write request to proceed. It will do this by issuing a response using response generator 100.

The data of the write may then be returned along with the state of that data to the coherency controller. The coherency controller can then ensure that data coherency is maintained by performing whatever steps are indicated by the state of the data. The state of the data that is transmitted with the data is the state immediately prior to the second part of the write request being performed. Thus, any changes of state that occur due to the snoops will have occurred and the state returned with the data will reflect this. This enables coherency controller 60 to maintain the coherency of the data and thus, although there was a potential data hazard and no hazard checking logic within the initiator device, coherency is maintained and a data hazard is avoided.

If the state of the data is such that the write no longer needs to proceed then it may be that the initiator device does not transmit the data and the state as the second part of the write request but rather transmits a write request cancelled signal. This requires less bandwidth and therefore has some advantages. If this write request cancelled signal is received by coherency controller 60 then the control circuitry 70 will free up the location in data buffer 85 that was reserved for the write.

It should be noted that although storage location reservation is described as though individual storage locations are reserved for particular data writes, implementations may simply increment a counter to indicate a number of locations in the data buffer that are reserved for second parts of write requests and the control circuitry 70 will ensure that this number of storage locations are kept available and are only used by the second part of write requests.

Figure 3:
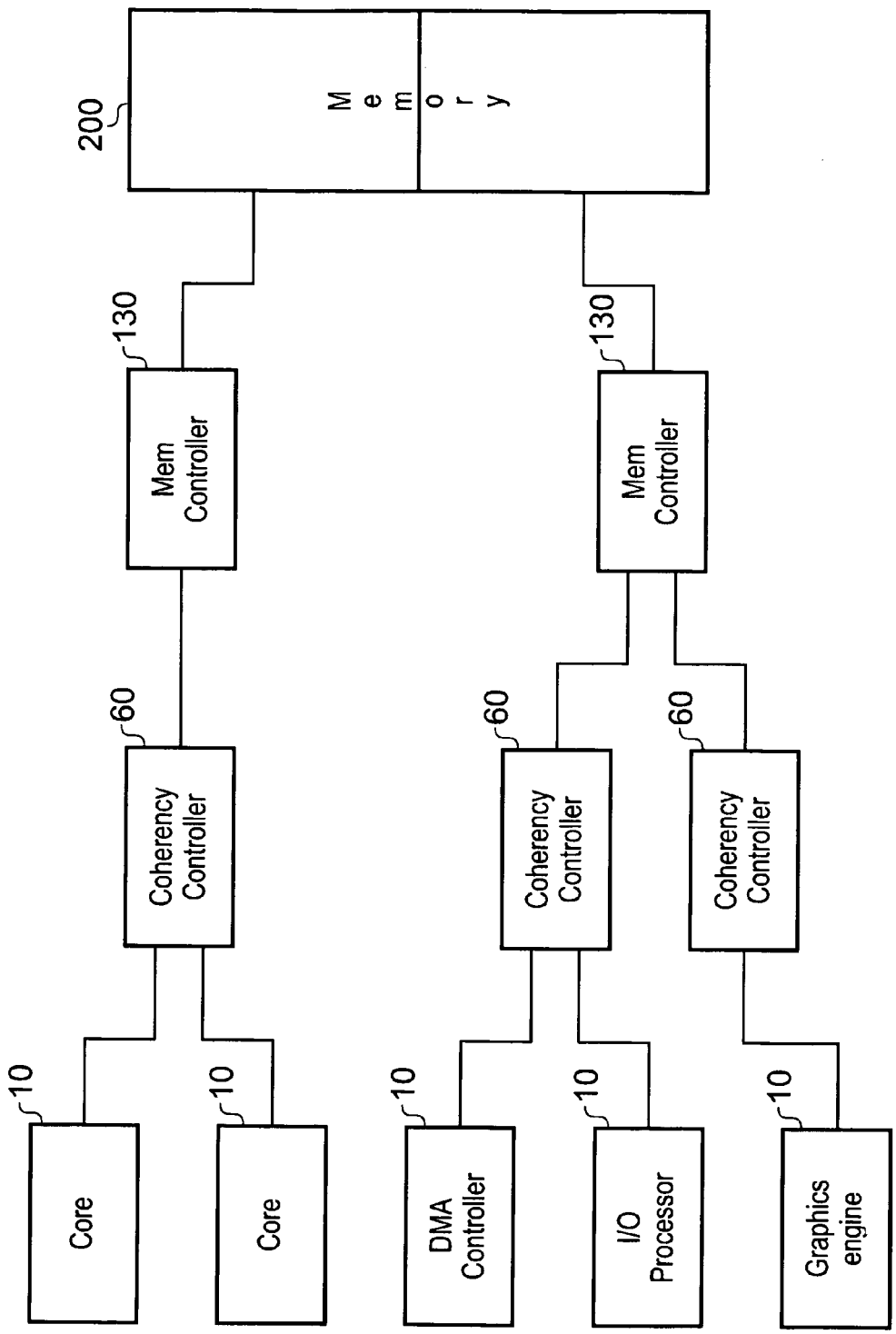
FIG. 3 shows a data processing system according to an embodiment of the present invention.

FIG. 3 shows a data processing system according to an embodiment of the present invention. In this system there are a number of initiator devices 10 which comprise processing cores, DMA controllers, an input/output processor and a graphics engine. There are also several coherency controllers 60 in this system and memory 200. In this embodiment memory 200 has different regions for access by different devices and there are coherency controllers and memory controllers that are specific to one or more of these regions of memory. In this embodiment there are two memory controllers 130 that access memory 200 and three coherency controllers 60.

Figure 4A:
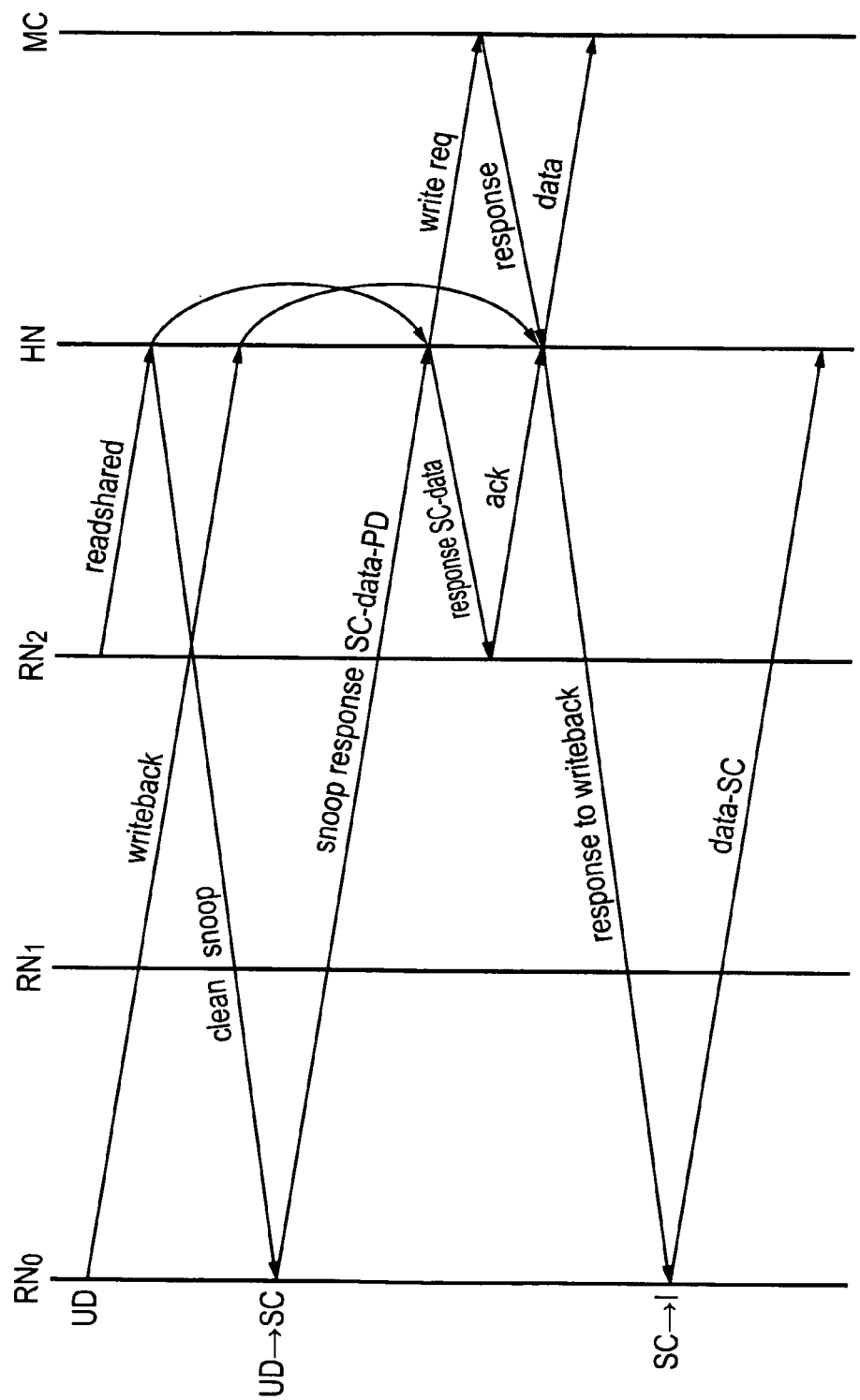
FIGS. 4a to 4c show schematically the progress of transactions through a data processing system according to an embodiment of the present invention.
Figure 4B:
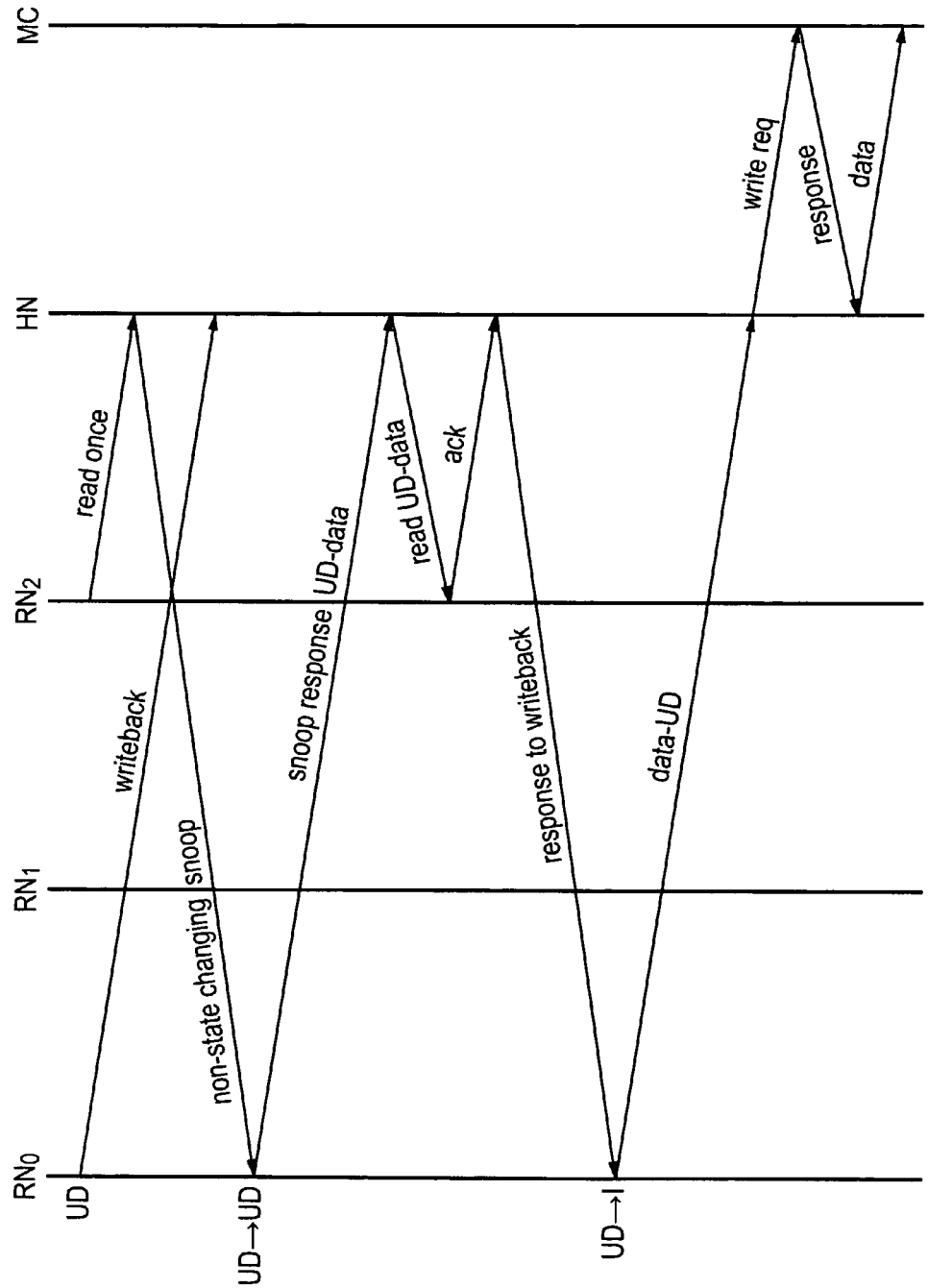
Figure 4C:
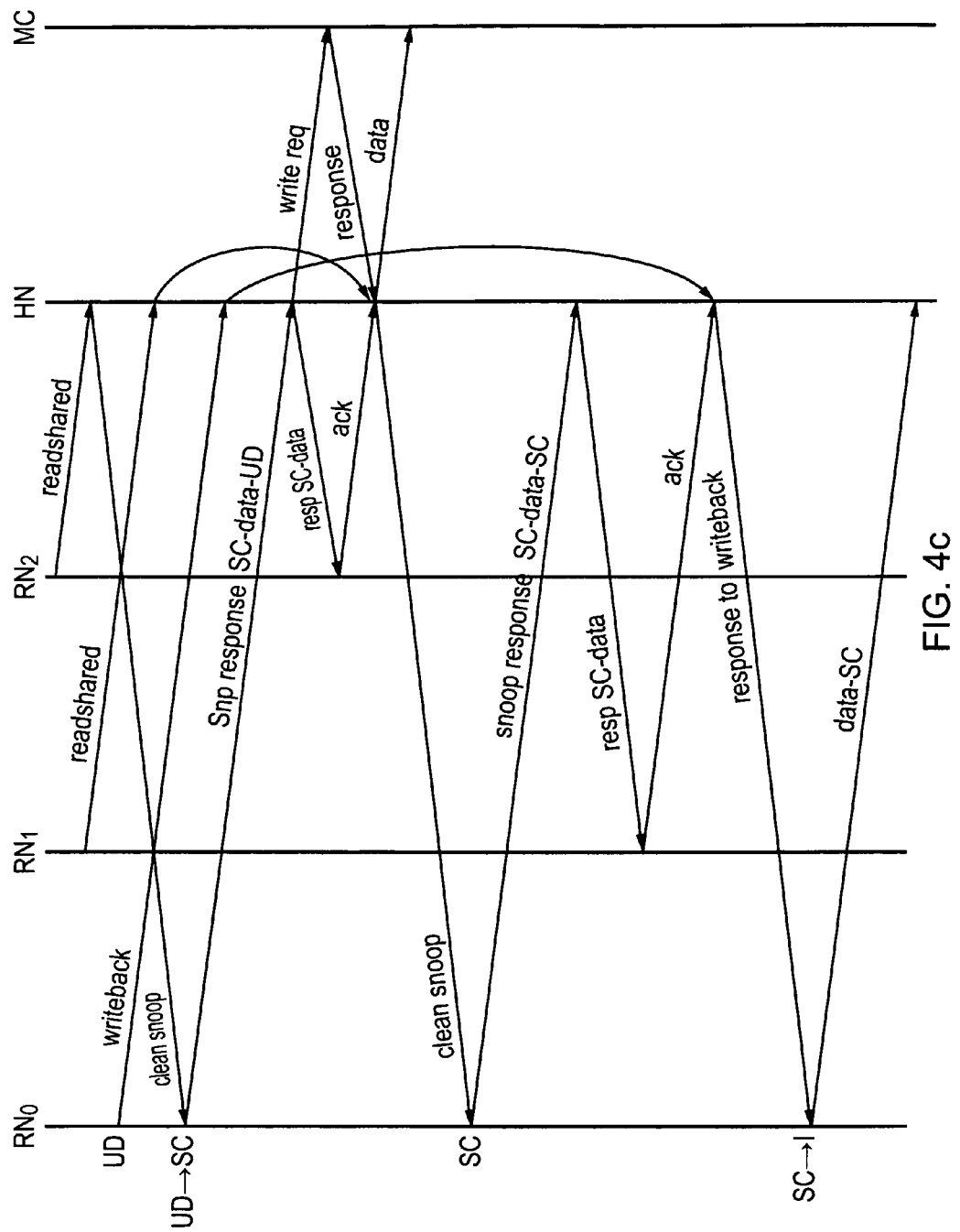

Some examples of the progress of transaction requests are shown in FIGS. 4a-4c.

FIG. 4a shows an example transaction request flow between three different initiator devices which are referred to as request nodes, that is RN0, RN1 and RN2, a home node which corresponds to the coherency controller 60 of FIG. 2 and a memory controller MC.

In this embodiment, a read shared request is issued by RN2 and is received at home node HN which outputs a clean snoop request to the various initiator devices that may be storing a local copy of the data. A clean snoop request is sent to RN0.

RN0 has at about the same time issued a writeback to the same address. A writeback request is a request to write dirty data to memory. Thus, the state of the data initially is unique and dirty in this case, this means that it is the only local copy of that data line and it is more up to date than the copy in memory. Thus, before the entry in the cache can be used by another data item it needs to be stored to memory using the writeback request.

Thus, there are two pending requests to the same address. The home node HN recognises on receipt of the writeback that there is a pending read request to the same address and it stalls the writeback request, which is the first part of a two-part write by not responding to this first part.

RN0 has no data hazard checking logic and proceeds to process the snoop regardless of the pending writeback request by sending a response to the clean snoop request, this response returns the data and indicators of the state before and after the snoop, i.e. that the data being returned was initially unique and dirty UD but has now been marked in the local store as shared clean SC. The home node HN receives this data and the information on the change of state and recognises that it needs to write the data back to memory such that the state, shared clean is correct. It therefore issues a write request to the memory controller and in response to a response from the memory controller issues the data to it. Furthermore, it issues a response to the read request to RN2 sending the data and the current state of the data with the response. When it receives an acknowledgment from RN2 the home node HN then allows the writeback request to proceed by responding to it.

In response to receiving this response the initiator device RN0 will update the shared clean state of the data to invalid as the writeback is to be completed and it will send the data along with an indication of the state of the data prior to the write completing that is shared clean to the home node HN. In response to receipt of this the home node HN will recognise that the data is now clean and the writeback does not need to be performed. It can therefore either perform the writeback or it can drop the data.

FIG. 4b shows a different example where a writeback issued by node RN0 is pending at the same time as a read once issued by RN2. When these are received at the coherency controller or home node HN, HN stalls the writeback by not responding to it and issues a non-state changing snoop in response to the read once request. The snoop returns the data from RN0 along with an indication of the state UD which does not change and this data is sent to RN2. As the state has not been changed at RN0, the home node HN does not write the data to memory. When an acknowledgement is received from RN2 then the HN knows that the read has completed and generates a response signal to the writeback request indicating the write can proceed. In response to receipt of this response the initiator device RN0 will transmit the data along with an indication of the data state UD and will update the state to invalid indicating that the writeback has been performed so that the cache line can be used for another data item.

When the home node HN receives the data it recognises from the state UD that the writeback still needs to be performed and it performs the writeback. In this way, the coherency controller at HN maintains the coherency of the data without stalling the snoop requests and without there being any data hazard checking logic within the requester nodes corresponding to the initiator device of FIG. 1.

FIG. 4c shows a further example of the progress of transactions where there are several reads pending when the writeback request is received at the coherency controller HN. Thus, in this example, RN1 and RN2 have both issued read shared transaction requests to the address of the pending writeback transaction from RN0. Thus, at the coherency device HN the writeback is stalled and the first read shared that was received from RN2 proceeds. A clean snoop is sent and the data stored at the address is returned along with the information that the state of this data has been changed from unique dirty UD to shared clean SC. On receipt of this data and the information on the state changes, the cache coherency controller HN will write the data back to memory and will also write the data along with its new state to RN2 that requested the data. Once this read has completed the second read will proceed, a clean snoop is performed and this time it is determined that the data stored at RN0 is in the shared clean SC state. Thus, the snoop response will return this data along with the information that it is in the shared clean SC state both before and after the snoop. In response to this, the coherency controller HN will issue a response to the read shared request from RN1 providing the data and an indication that the data is in the shared clean SC state. It will not write the data to memory as the data state was shared clean both before and after the snoop. When RN1 has acknowledged that it has received the read, the read is in effect completed and the coherency controller HN will allow the writeback received from RN0 to continue. Thus, when it has sufficient space in its data buffer to receive a write request, it responds to the writeback and in response to receipt of this response RN0 sends the data along with an indication of the state of the data prior to the writeback that is shared clean SC. The state of the data is then changed to invalid. As in FIG. 4a the cache controller may or may not write the received data to memory. The data is not required by the memory but it can be written if uniformity of data flow is preferred.

It should be noted that although in these examples in response to the writeback the data is sent back along with the indication of the state (shared clean), in some embodiments a write cancelled request might be sent back if the state is shared clean as the data is not in fact required. This will have the effect of allowing the coherency controller to release the storage location that has been reserved for the writeback data and it has the advantage of using less bandwidth. However, it requires the use of the further write cancelled transaction and the system is not so uniform. Similarly if the state of the data after the snoop were invalid then the data and invalid state might be transmitted as the second part of the write request, or a write cancelled request might be transmitted instead.

Figure 5:
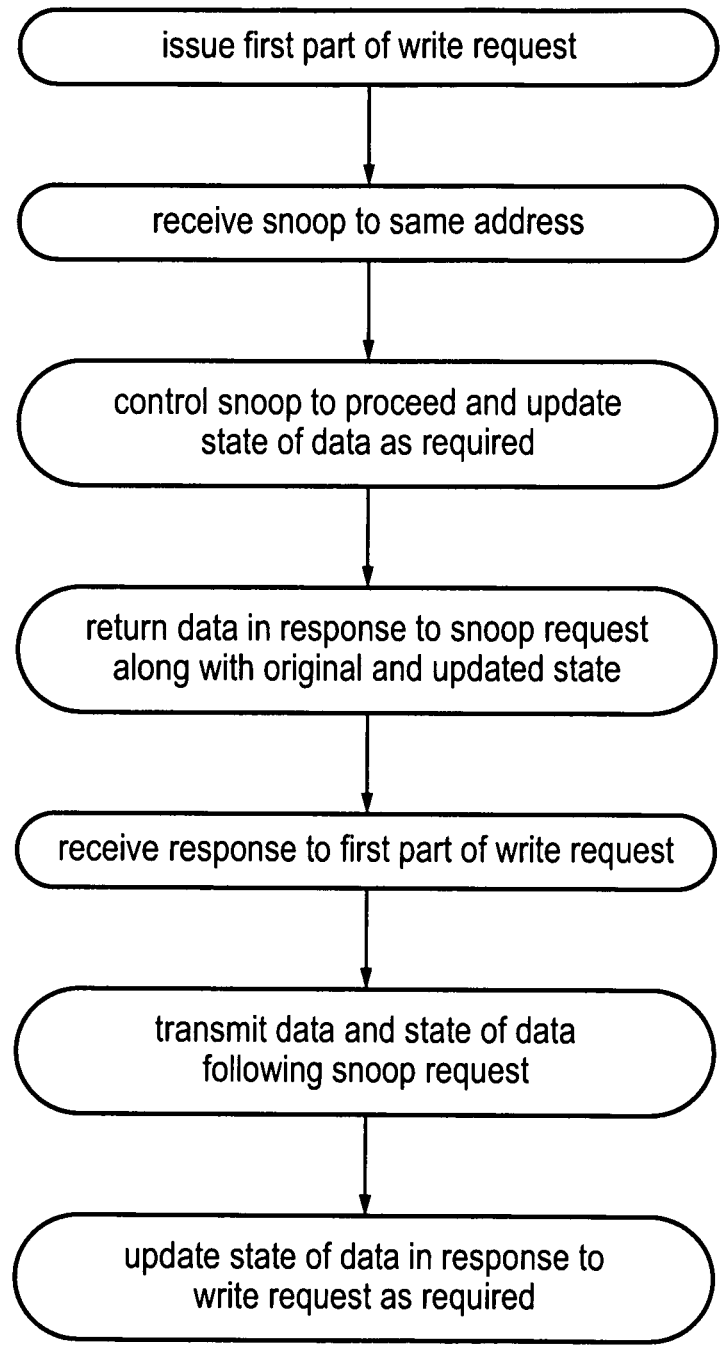
FIG. 5 shows a flow diagram illustrating steps in a method performed by initiator device according to an embodiment of the present invention.

FIG. 5 shows a flow diagram of steps that are performed by an initiator device according to an embodiment of the present invention. In this embodiment the initiator device will issue the first part of a write request and then it may receive a snoop to the same address. It will proceed to process the snoop as though there is not a write request to that address pending. Thus, the snoop will proceed and will update the state of the data as required and the data will be returned in response to the snoop request along with the original and updated state.

A response to the first part of the write request will then be received. It will not be received earlier as the coherency controller will not response to the first part of the write request until the pending read that has generated the snoop to the same address has completed. When a response to the first part of the write request has been received then the initiator device will continue with the write request by transmitting data and the state that the data is in following the snoop request. The state of the data may then be updated in response to the write request as is required. It should be noted that if the state of the data indicates that the writeback is no longer required, then in some embodiments rather than performing the last two blocks of this flow diagram, a write cancel request is simply transmitted.

Figure 6:
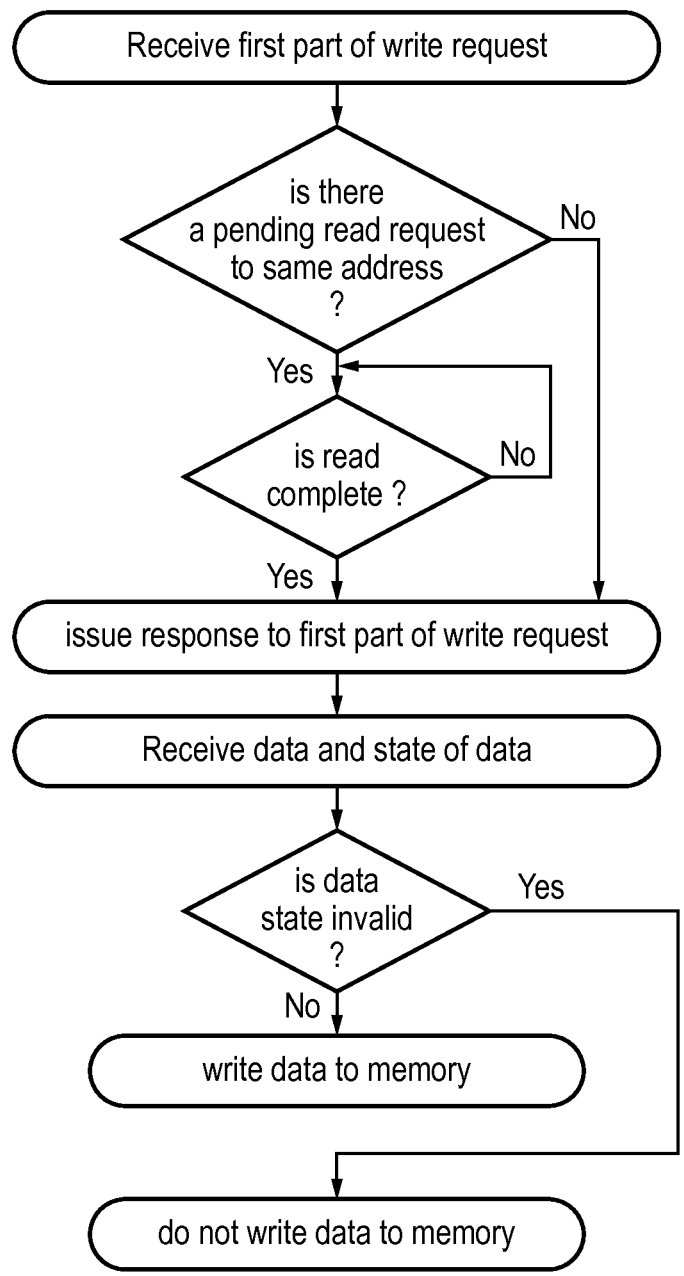
FIG. 6 shows a flow diagram illustrating steps in a method performed by a coherency controller according to an embodiment of the present invention.

FIG. 6 shows steps in a method performed at a coherency controller according to an embodiment of the present invention. In this embodiment a first part of a write request is received and the coherency controller determines with its hazard checking logic if there is a pending read request to the same address. If there isn't then it can proceed to process the write request. If there is then it will stall the write request and it will not proceed with the write request until it has determined that the read is complete. When it has determined this it is complete then it will issue a response to the first part of the write request. It will then receive the data and the state of the data as the second part of the write request and depending on the state of the data, may or may not write the data back to memory. In this embodiment if the data state is invalid it will not write it back and if it is valid it will write it back. It should be appreciated that in other embodiments if the data is clean it will not be written back to memory while if it is dirty it will be written back to memory. The choice of whether to write clean data back or not is an implementation choice, while invalid data must not be written back.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A coherency controller for maintaining data coherency of data stored in a data processing apparatus comprising at least one initiator device and at least one recipient device, said coherency controller comprising:
at least one port for receiving data access requests from said at least one initiator device and for transmitting said data access requests and snoop requests to at least one of said at least one initiator device and said at least one recipient device;
a buffer configured to store pending data access requests;
snoop request generating circuitry configured to generate said snoop requests in response to said pending data access requests, said snoop requests determining whether data to be accessed is stored locally in one or more of said at least one initiator device and said at least one recipient device; and
coherency control circuitry, responsive to receipt of a first part of a write request comprising an indication that a write is to be performed to an address for which a read request is pending, configured to stall said write request by not responding to said first part of said write request until after the pending read request has completed, wherein said coherency control circuitry is responsive to receipt of a signal indicating completion of said read request to respond to said first part of said write request; and
said coherency control circuitry, responsive to receipt of a second part of said write request received after the response to said first part of said write request and comprising said data and an indication of a state of said data prior to said write request, to write said data to said at least one recipient device.

2. A coherency controller according to claim 1, wherein said coherency control circuitry is configured to write said data to said at least one recipient device if said state indicates said data is valid and is a more up to date version than a version of said data stored elsewhere.

3. A coherency controller according to claim 2, wherein said coherency control circuitry is responsive to receipt of said second part of said write request comprising said data and an indication that a state of said data is invalid not to write said data further.

4. A coherency controller according to claim 3, wherein said coherency control circuitry is responsive to receipt of said second part of said write request comprising said data and an indication that a state of said data is valid and is the same as a value of said data stored elsewhere not to write said data further.

5. A coherency controller according to claim 3, wherein said coherency control circuitry is responsive to receipt of said second part of said write request comprising a write request cancelled indication to free up a reserved storage location.

6. A coherency controller according to claim 1, wherein all storage locations within said buffer are available for storing both read and write requests at start up, said coherency control circuitry is configured to reserve a given storage location for a second part of said write request upon receiving said first part of said write request and to respond to said first part of said write request with a data acceptance guarantee response indicating that said given storage location is reserved.

7. A method of maintaining coherency of data comprising:
receiving data access requests from at least one initiator device;
transmitting said data access requests and snoop requests to at least one of said at least one initiator device and at least one recipient device;
storing pending data access requests;
generating snoop requests in response to said pending data access requests, said snoop requests determining whether said data to be accessed is stored locally in one or more of said at least one initiator device and said at least one recipient devices;
in response to receipt of a first part of a write request comprising an indication that a write is to be performed to an address for which a read request is pending, stalling said write request by not responding to said first part of said write request until after the pending read request has completed,
in response to receipt of a signal indicating completion of said read request, responding to said first part of said write request; and
in response to receipt of a second part of said write request received after the response to said first part of said write request and comprising said data and an indication of a state of said data prior to said write request, writing said data to said at least one recipient device.

8. A coherency controlling means for maintaining data coherency of data stored in a data processing apparatus comprising at least one initiator device and at least one recipient device, said coherency controlling means comprising:
at least one port means for receiving data access requests from said at least one initiator device and for transmitting said data access requests and snoop requests to at least one of said at least one initiator device and said at least one recipient device;
a buffer means for storing pending data access requests;
snoop request generating means for generating said snoop requests in response to said pending data access requests, said snoop requests determining whether data to be accessed is stored locally in one or more of said at least one initiator device and said at least one recipient devices; and coherency control means for responding to receipt of a first part of a write request comprising an indication that a write is to be performed to an address for which a read request is pending, by stalling said write request by not responding to said first part of said write request until after the pending read request has completed, wherein said coherency control means is responsive to receipt of a signal indicating completion of said read request to respond to said first part of said write request; and said coherency control means, responsive to receipt of a second part of said write request received after the response to said first part of said write request and comprising said data and an indication of a state of said data prior to said write request, writing said data to said at least one recipient device.

\* \* \* \* \*